(12) United States Patent
Jeon

(10) Patent No.: US 6,356,833 B2
(45) Date of Patent: Mar. 12, 2002

(54) VEHICLE SPEED CONTROL SYSTEM USING WIRELESS COMMUNICATIONS AND METHOD FOR CONTROLLING THE SAME

(75) Inventor: Yong-Won Jeon, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/727,798

(22) Filed: Nov. 30, 2000

(30) Foreign Application Priority Data

Dec. 14, 1999 (KR) .............................................. 99-57402

(51) Int. Cl.$^7$ .............................. B60T 8/32; G05D 1/00; G05D 13/00; G05D 17/00; G06F 7/00; G06F 3/00; G06F 9/00; G06F 13/00; G06F 17/00; G06F 19/00; G06F 165/00

(52) U.S. Cl. ......................... 701/93; 701/110; 701/102; 701/121; 701/200-204; 701/206; 701/207; 701/23-25; 701/28; 701/65; 701/29; 701/33; 701/35; 701/41; 701/70; 701/74; 701/79; 701/51; 318/381; 318/375; 318/376; 318/379; 340/439; 340/438; 180/167; 180/168; 180/169

(58) Field of Search .......................... 701/93, 110, 102, 701/121, 200–204, 206, 207, 23–25, 28, 65, 29, 33, 35, 41, 70, 74, 79, 51; 318/381, 375, 376, 379; 340/439, 438, 435; 180/168, 167, 169

(56) References Cited

U.S. PATENT DOCUMENTS

| | | | |
|---|---|---|---|
| 4,284,936 A | * | 8/1981 | Bailey et al. ................ 318/381 |
| 5,182,711 A | * | 1/1993 | Takashashi et al. ..... 364/424.05 |
| 5,765,116 A | * | 6/1998 | Wilson-Jones et al. ........ 701/41 |
| 5,884,027 A | * | 3/1999 | Garbus et al. ............ 395/200.8 |
| 5,913,045 A | * | 6/1999 | Gillespie et al. ............. 395/309 |
| 6,085,137 A | * | 7/2000 | Aruga et al. ................... 701/51 |
| 6,098,005 A | * | 8/2000 | Tsukamoto et al. ............ 701/65 |
| 6,184,823 B1 | * | 2/2001 | Smith et al. ........... 342/357.13 |
| 6,220,986 B1 | * | 4/2001 | Argua et al. ................... 477/97 |
| 6,231,477 B1 | * | 5/2001 | Hollingsworth et al. ..... 477/107 |
| 6,273,771 B1 | * | 8/2001 | Buckley et al. ................ 440/84 |
| 2001/0003808 A1 | * | 6/2001 | Jeon ............................. 701/93 |
| 2001/0008083 A1 | * | 7/2001 | Brown | |
| 2001/0015548 A1 | * | 8/2001 | Breed et al. | |

* cited by examiner

Primary Examiner—William A. Cuchlinski, Jr.
Assistant Examiner—Ronnie Mancho
(74) Attorney, Agent, or Firm—Christie, Parker & Hale, LLP

(57) ABSTRACT

Disclosed a vehicle speed control system using wireless communications, the system including a driving state detecting unit for detecting a driving state and outputting corresponding signals; a transmitter/receiver for outputting low-strength signals; an electronic control unit for receiving the signals of the transmitter/receiver and establishing an ISA mode if necessary, determining if a present driving state corresponds to a first driving state, determining if the driver has performed deceleration operations and performing control into the first driving state if needed; an engine control unit for outputting signals for control of the throttle valve opening; a throttle valve electronic control unit for outputting electrical signals to a throttle valve to control the same; and a display for displaying a present mode and a vehicle state. A method for controlling the system comprises the steps of receiving signals from an RF transmitter/receiver to determine if a vehicle is in a first driving state; establishing an ISA mode and performing display of the ISA mode; determining a present driving state for comparison with the first driving state and performing display to inform the driver of the result of the comparison; determining if the driver has performed a deceleration operation if the present driving state does not correspond to the first driving state; disengaging the ISA mode and enabling full control of the vehicle by the driver if the present driving state corresponds to the first driving state or if the driver has performed a deceleration operation; and controlling an engine control unit via CAN communications if the driver has not performed a deceleration operation.

6 Claims, 3 Drawing Sheets

VEHICLE SPEED CONTROL SYSTEM USING WIRELESS COMMUNICATIONS AND METHOD FOR CONTROLLING THE SAME

CROSS-REFERENCE TO RELATED APPLICATION

This application claims priority of Korea patent Application No. 99-57402, filed on Dec. 14, 1999.

BACKGROUND OF THE INVENTION (a) Field of the Invention

The present invention relates to an operational control system for vehicles, and more particularly, to a vehicle speed control system using wireless communications and a method for controlling the same.

(b) Description of the Related Art

There are two main types of prior vehicle speed control systems. One uses a GPS (Global Positioning System), while the other uses RF (radio frequency) communications. In the vehicle speed control system using a GPS, after the position of a vehicle is determined, speed limit information corresponding to vehicle position is used to possibly alert the driver or control the vehicle. With the system using RF communications, the vehicle is controlled in areas where RF signals are received. Both these systems are still undergoing testing in Europe, Japan and other countries.

A drawback of the system utilizing the GPS is that road information of a uniform setting is used. That is, changes in road conditions are not taken into account. With the system in which RF communications are used, on the other hand, vehicle control is realized according to pre-installed road information, and each RF transmitter is controlled such that vehicle control is performed to match changing weather and road conditions.

However, a serious drawback of the system utilizing RF communications is that the system is limited to use in only areas where RF signals are received. Accordingly, a strong output is required by the RF transmitters, and, as a result, the same information may be transmitted to more than just the targeted vehicle. That is, unwanted control of a vehicle travelling in the opposite lane may result. Vehicle speed control is particularly problematic in areas where there are curves in the road.

SUMMARY OF THE INVENTION

The present invention has been made in an effort to solve the above problems.

It is an object of the present invention to provide a vehicle speed control system using wireless communications and a method for controlling the same in which vehicle control is possible with only a small output by a RF transmitter, and in which unanticipated vehicle control is prevented.

To achieve the above object, the present invention provides a vehicle speed control system using wireless communications and a method for controlling the same. The system comprises a driving state detecting unit for detecting steering angle, vehicle speed, throttle valve opening, brake operation, and turn signal operation, and outputting corresponding signals; a transmitter/receiver for outputting low-strength signals containing information of a speed limit and a range of the speed limit; an electronic control unit for receiving the signals of the transmitter/receiver and establishing an ISA mode if necessary, determining if a present driving state corresponds to a first driving state using the signals of the driving state detecting unit, determining if the driver has performed deceleration operations, and performing control into the first driving state if needed; an engine control unit for outputting signals for control of the throttle valve opening according to control signals of the electronic control unit; a throttle valve electronic control unit for receiving the signals output from the engine control unit and outputting electrical signals to a throttle valve to control an opening degree of the throttle valve; and a display for displaying a present mode and a vehicle state according to the control signals of the electronic control unit.

According to a feature of the present invention, the transmitter/receiver is provided adjacent to a specific lane, and the low-strength signals of the transmitter/receiver are such that vehicles traveling on the opposite lane do not receive the signals.

According to another feature of the present invention, the electronic control unit determines if the present driving state corresponds to the first driving state after establishing the ISA mode, enables full control of the vehicle by the driver if the present driving state corresponds to the first driving state, and control the display to output a warning message if the present driving state does not correspond to the first driving state.

According to yet another feature of the present invention, the electronic control unit determines if the driver has performed a deceleration operation during a predetermined interval after output of the warning message, enables full control of the vehicle by the driver if the driver has performed a deceleration operation, and performing control into the first driving state if the driver has not performed a deceleration operation.

The method for controlling the vehicle control system using wireless communications comprising the steps of receiving signals from an RF transmitter/receiver to determine if a vehicle is in a first driving state in a speed limit zone; establishing an ISA mode for control into the first driving state and performing display to alert the driver of such control; determining a present driving state, comparing the present driving state with the first driving state, determining if the present driving state corresponds to the first driving state, and performing display to inform the driver of the result of the comparison; determining if the driver has performed a deceleration operation if the present driving state does not correspond to the first driving state; disengaging the ISA mode and enabling full control of the vehicle by the driver if the present driving state corresponds to the first driving state or if the driver has performed a deceleration operation; and controlling an engine control unit via CAN communications if the driver has not performed a deceleration operation, engine control being performed such that a throttle valve is controlled to reduce the speed of the vehicle.

According to a feature of the present invention, the step of determining if the driver has performed a deceleration operation comprises the steps of (a) determining if the driver has depressed a brake, determining if the driver has released an accelerator pedal, or if the a throttle valve opening is less than a predetermined throttle valve opening; (b) determining if the driver has operated a turn signal if one of the conditions of step (a) is not satisfied; (c) determining if a steering angle is greater than or equal to 30° if the driver has not operated a turn signal; (d) maintaining the ISA mode if the steering angle is less than 30°; (e) disengaging the ISA if any of the conditions of steps (a), (b) and (c) are satisfied.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
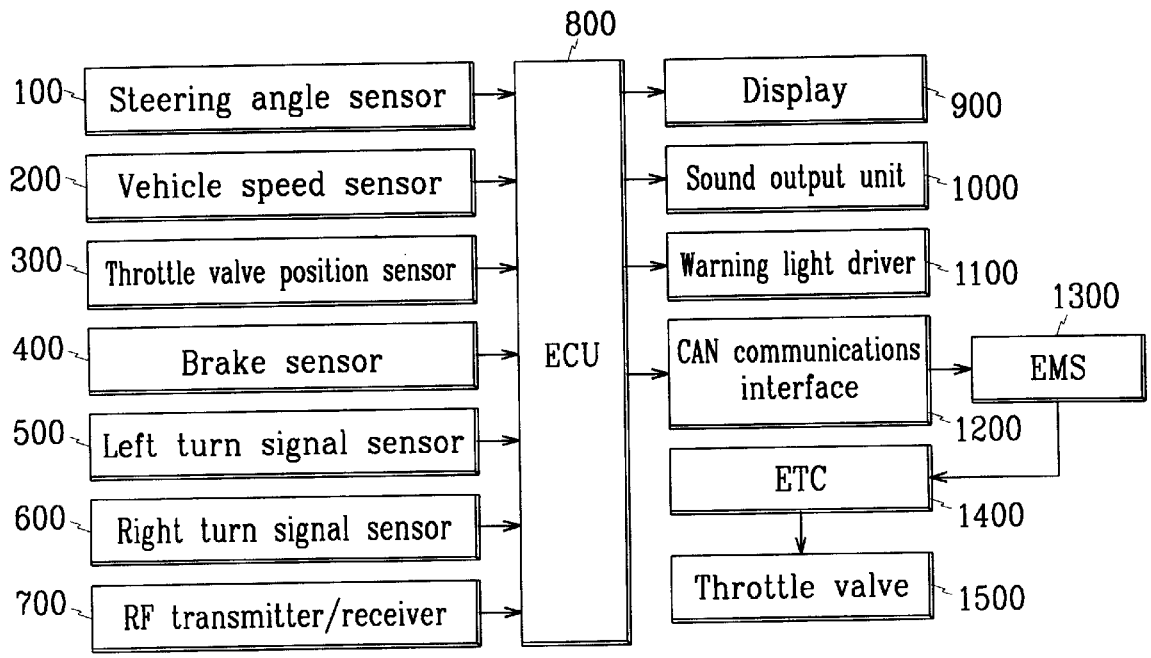
FIG. 1 is a block diagram of a vehicle speed control system using wireless communications according to a preferred embodiment of the present invention.

FIG. 1 shows a block diagram of a vehicle speed control system using wireless communications according to a preferred embodiment of the present invention.

As shown in the drawing, the vehicle speed control system includes a steering angle sensor 100, a vehicle speed sensor 200, a throttle valve position sensor 300, a brake sensor 400, left turn signal sensor 500, a right turn signal sensor 600, an RF transmitter/receiver 700, an ECU 800, a display 900, a sound output unit 1000, warning light driver 1100, a CAN communications interface 1200, an EMS 1300, an ETC (electronic throttle valve controller) 1400, and a throttle valve 1500.

The steering angle sensor 100 detects the operation of a steering wheel (i.e., the degree to which the steering wheel has been rotated by the driver), and outputs corresponding electrical signals to the ECU 800. The vehicle speed sensor 200 detects a present vehicle speed and outputs corresponding electrical signals to the ECU 800. The throttle valve position sensor 300 detects an opening degree of a throttle valve and outputs corresponding electrical signals to the ECU 800. The brake sensor 400 detects driver operation of a brake pedal and outputs corresponding electrical signals to the ECU 800. The left turn signal sensor 500 and the right turn signal sensor 600 detect the operation of a turn signal and output corresponding electrical signals to the ECU 800.

The RF transmitter/receiver 700 is installed at a specific location adjacent to a road, and outputs a signal including a message for controlling a vehicle at a predetermined speed and for a set distance. The RF transmitter/receiver 700 outputs a weak signal such that vehicles travelling in an opposite lane do not receive the signal. At this time, since the output of the RF transmitter/receiver 700 is weak such that the entire speed limit zone is not covered, information of a range of the speed limit zone is included in the signal.

The RF transmitter/receiver 700 receives control signals from a control center, the control signals varying operational and output messages of the RF transmitter/receiver 700. It is also possible for the RF transmitter/receiver 700 to receive signals from vehicles such that the control center is alerted of changes in road conditions such as those caused by a change in weather and the occurrence of an accident.

The ECU 800 determines the present driving state of the vehicle from the signals received from the various sensors 100–600 and from the RF transmitter/receiver 700. From the signals output by the RF transmitter/receiver 700, the presence of a first driving state zone is determined. The ECU 800 compares two driving states to determine if the driver has performed deceleration operations to thereby determine if forced control into the first driving state is required. If such control is needed, corresponding control signals are output by the ECU 800.

The display 900 is realized through an LED (light emitting diode) and a VFD (vacuum fluorescent display). However, it is possible to use other display elements such as an LCD (liquid crystal display). The display 900 enables the driver to check the present driving state controlled by the ECU 800, as well as a mode set up the by ECU 800. The sound output unit 1000 alerts the driver when the present driving state does not correspond to the first driving state. The warning light driver 1100 operates a warning light according to control by the ECU 800 when the vehicle is forced into the first driving state. The CAN communications interface 1200 receives control signals from the ECU 800 and transmits the control signals to the EMS 1300 via CAN communications. After receiving the control signals from ECU 800 via the CAN communications interface 1200, the EMS 1300 outputs control signals for control the opening degree of the throttle valve 1500. The ETC 1400 outputs electrical signals to the throttle valve 1500 according to the control signals output by the EMS 1300 to control throttle valve opening.

Figure 2A:
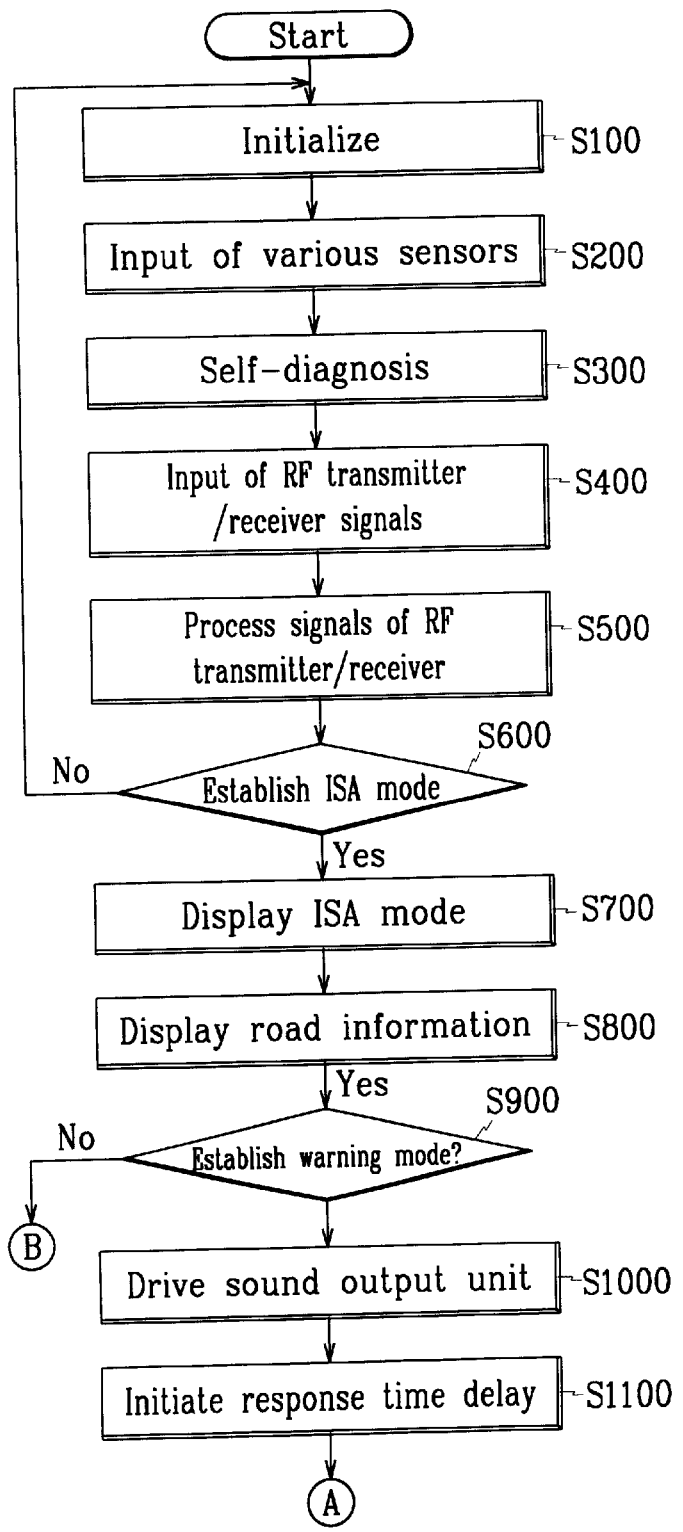
FIG. 2, consisting of FIGS. 2A and 2B, are flow charts of a method for controlling the vehicle speed control system using wireless communications of FIG. 1 according to a preferred embodiment of the present invention.
Figure 2B:
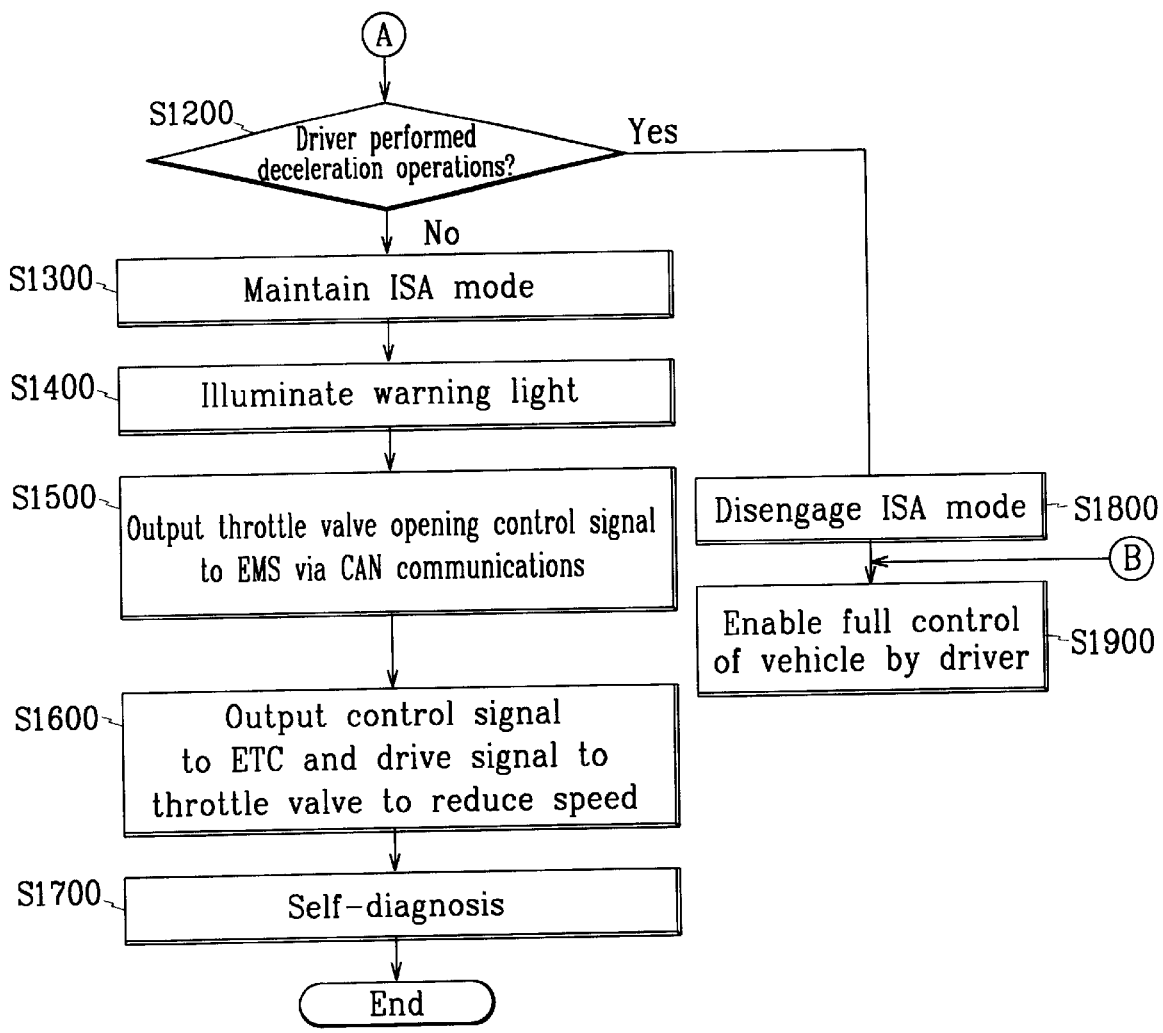

FIG. 2 shows a flow chart of a method for controlling the vehicle speed control system using wireless communications described above.

After the vehicle is started, the ECU 800 initializes an operational program in step S100, after which the ECU 800 receives the signals output by the sensors 100 through 600 to determine the present driving state of the vehicle in step S200. That is, the ECU 800 determines the present vehicle speed and throttle valve opening from the signals output by the vehicle speed sensor 200 and the throttle valve position sensor 300, respectively. Also, the ECU determines the driving direction of the vehicle and whether the brake is depressed from the signals output by the steering angle sensor 100, the brake sensor 400, and the left and right turn signal sensors 500 and 600.

Subsequently, the ECU 800 performs a self-diagnosis using the signals input from the various sensors 100 through 600, and signals received from other sensors corresponding to engine rpm and turbine rpm in step S300. That is, the ECU 800 determines if there is any malfunction, and if there is, performs the necessary control. Accordingly, a stable driving state is realized.

If the vehicle enters a special speed limit zone, that is an area where there is a substantial curve in the road, an area where weather conditions require slower driving, or a school zone area, signals transmitted by the RF transmitter/receiver 700 are received by the vehicle in step S400. The ECU 800 then processes the signals of the RF transmitter/receiver 700 to determine if control into the first driving state is needed in step S500. The first driving state refers to the driving state needed when driving through a special speed limit zone.

In the above, since weak signals are output by the RF transmitter/receiver 700, the entire special speed limit zone can not be covered. Accordingly, information of the range of the special speed limit zone is included in the signals. Hence, the ECU 800 determines from the signals of the RF transmitter/receiver 700 both the requirement for control into the first driving state and the range of the special speed limit zone.

Next, the ECU 800 establishes an ISA mode for controlling the driving state of the vehicle into the first driving state in step S600. After completing this step, the ECU 800 drives the display 900 to inform the driver that the ISA mode has been established in step S700. That is, the display 900 illuminates the LED to inform the driver of the establishment of the ISA mode. Next, through the VFD, the display 900 informs the driver of road information such as the speed limit, whether the vehicle is speeding, and the reason for the special speed limit zone (curves in the road, fog area, school zone, etc.) in step S800.

After driving the display 900 as in the above, the ECU 800 checks whether the present driving state corresponds to the first driving state to determine if the ISA mode needs to be established, and, finally, to determine if a warning mode needs to be established in step S900. Here, the comparison of the present driving state with the first driving state is performed to determine whether the present driving state already corresponds to the first driving state such that further control is not required. If the present driving state corresponds to the first driving state, the ECU 800 disengages the ISA mode in step S1800 such that the vehicle is driven according to driver operation in step S1900. Following this step, the ECU 800 continues to receive signals from the sensors 100–600 to monitor the present driving state. However, if the present driving state does not correspond to the first driving state after entering a special speed limit zone, the ISA mode is established and the following operations are performed.

In particular, in the case where the present driving state does not correspond to the first driving state in step S900, the ECU 800 drives the sound output unit 1000 such that the driver is alerted by a sound warning message that the vehicle has entered a special speed limit zone and also that the present driving state does not correspond to the first driving state in step S1000. The duration of the output by the sound output unit 1000 can be varied by the manufacturer.

Next, the ECU 800 initiates a response time delay for a predetermined time during which no control is performed in step S1100. This allows the driver some time to react to the sound warning message. After the response time delay, the ECU 800 determines if the driver has performed deceleration operations in step S1200. That is, using the output of the brake sensor 400, the steering angle sensor 100, and the left and right turn signal sensors 500 and 600, the ECU 800 initiates the procedure outlined in FIG. 3 to determine if the driver has performed deceleration operations. Here, deceleration operations refer to those actions taken by the driver resulting in the vehicle being driven in the first driving state such that forced control is unneeded.

Figure 3:
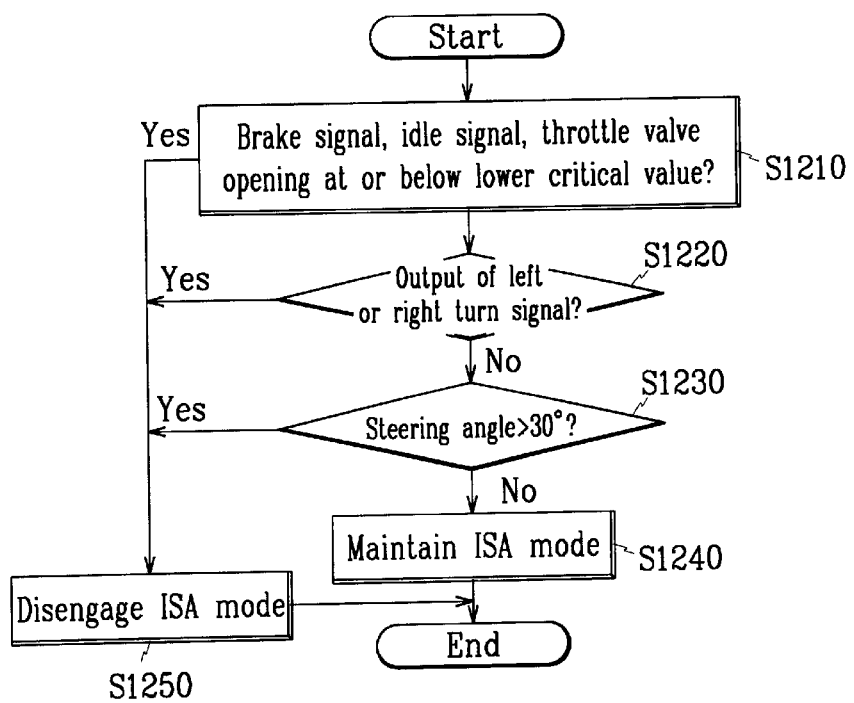
FIG. 3 is a flow chart of a process for determining when the driver has performed deceleration operations.

With reference to FIG. 3, the ECU 800 first determines if a brake signal has been output by the brake sensor 400, or if an idle signal has been output by an idle switch (not shown), or through the signals output by the throttle valve position sensor 300 if a throttle valve opening is at or below a lower critical value in step S1210. That is, it is determined respectively if the brake pedal has been depressed, or if the accelerator pedal has been released, or if the accelerator pedal is depressed only slightly, which are all indicative of deceleration operations by the driver. If it is determined one or more of the conditions of step S1210 are satisfied, the ECU 800 disengages the ISA mode in step S1250.

However, if none of the conditions of step S1210 are satisfied, the ECU 800 determines if the left turn signal sensor 500 or the right turn signal sensor 600 has output a signal in step S1220. Here, input by the left or right turn signal sensors 500 and 600 is regarded as the driver's intention to move from the present lane to a slow speed lane. If a signal from the left or right turn signals 500 and 600 is received, the ECU 800 then disengages the ISA mode in step S1250.

If no signal is received from the left turn signal sensor 500 or the right turn signal sensor 600, the ECU 800 then determines if a steering angle is greater than 30° in step S1230. That is, from the signals output from the steering angle sensor 100, the ECU 800 determines if the steering wheel has been rotated by the driver more than 30° in either direction. Such operation of the steering wheel is also regarded as the driver's intention to a slow speed lane. This step is performed in addition to step S1220 since it is possible for the driver to change lanes without the use of turn signals.

If the condition of step S1230 is not satisfied, the ISA mode is maintained in step S1300 of FIG. 2. In more detail, if none of the conditions outlined in FIG. 3 are satisfied, it is determined that the driver has not performed any deceleration operations such that it is necessary to maintain the establishment of the ISA mode. Next, the ECU 800 outputs a drive signal to the warning light driver 1100 such that the warning light is illuminated in step S1400.

The above is followed by actual forced control into the first drive state (i.e., implementation of the ISA mode). That is, the ECU 800 does not directly perform control to reduce throttle valve opening, but instead outputs a throttle valve opening control signal to the EMS 1300 via the CAN communications interface 1200 in step S1500. After receiving the throttle valve opening control signal, the EMS 1300 outputs a control signal to the ETC 1400, which, in turn, outputs a drive signal to the throttle valve 1500 such that the throttle valve opening is reduced to less than the predetermined lower critical value in step S1600. Accordingly, vehicle speed is reduced to correspond to the first driving state.

In step S1200, if the ECU 800 determines the driver has performed deceleration operations, the ECU 800 disengages the ISA mode in step S1800 such that the vehicle is driven according to driver operation in step S1900.

There are many advantages to the vehicle speed control system using wireless communications and method for controlling the same of the present invention described above: it is acceptable for the output of the RF transmitter/receiver to be weak, thereby preventing non-targeted vehicles (i.e., vehicles travelling in the opposite lane) from receiving control; smooth control is performed as a result of vehicle speed control by the ECU; and driver deceleration operations are detected such that unwanted control is not performed.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A vehicle speed control system using wireless communications comprising:

a driving state detecting unit for detecting steering angle, vehicle speed, throttle valve opening, brake operation, and turn signal operation, and outputting corresponding signals;

a transmitter/receiver for outputting low-strength signals containing information of a speed limit and a range of the speed limit;

an electronic control unit for receiving the signals of the transmitter/receiver and establishing an ISA mode if necessary, determining if a present driving state corresponds to a first driving state using the signals of the driving state detecting unit, determining if the driver has performed deceleration operations, and performing control into the first driving state if needed;

an engine control unit for outputting signals for control of the throttle valve opening according to control signals of the electronic control unit;

a throttle valve electronic control unit for receiving the signals output from the engine control unit and outputting electrical signals to a throttle valve to control an opening degree of the throttle valve; and a display for displaying a present mode and a vehicle state according to the control signals of the electronic control unit.

2. The vehicle speed control system of claim 1 wherein the transmitter/receiver is provided adjacent to a specific lane, and the low-strength signals of the transmitter/receiver are such that vehicles traveling on the opposite lane do not receive the signals.

3. The vehicle speed control system of claim 1 wherein the electronic control unit determines if the present driving state corresponds to the first driving state after establishing the ISA mode, enables full control of the vehicle by the driver if the present driving state corresponds to the first driving state, and control the display to output a warning message if the present driving state does not correspond to the first driving state.

4. The vehicle speed control system of claim 3 wherein the electronic control unit determines if the driver has performed a deceleration operation during a predetermined interval after output of the warning message, enables full control of the vehicle by the driver if the driver has performed a deceleration operation, and performing control into the first driving state if the driver has not performed a deceleration operation.

5. A method for controlling a vehicle control system using wireless communications comprising the steps of:

receiving signals from an RF transmitter/receiver to determine if a vehicle is in a first driving state in a speed limit zone;

establishing an ISA mode for control into the first driving state and performing display to alert the driver of such control;

determining a present driving state, comparing the present driving state with the first driving state, determining if the present driving state corresponds to the first driving state, and performing display to inform the driver of the result of the comparison;

determining if the driver has performed a deceleration operation if the present driving state does not correspond to the first driving state;

disengaging the ISA mode and enabling full control of the vehicle by the driver if the present driving state corresponds to the first driving state or if the driver has performed a deceleration operation; and controlling an engine control unit via CAN communications if the driver has not performed a deceleration operation, engine control being performed such that a throttle valve is controlled to reduce the speed of the vehicle.

6. The method of claim 5 wherein the step of determining if the driver has performed a deceleration operation comprises the steps of:

(a) determining if the driver has depressed a brake, determining if the driver has released an accelerator pedal, or if the a throttle valve opening is less than a predetermined throttle valve opening;

(b) determining if the driver has operated a turn signal if one of the conditions of step (a) is not satisfied;

(c) determining if a steering angle is greater than or equal to 30° if the driver has not operated a turn signal;

(d) maintaining the ISA mode if the steering angle is less than 30°;

(e) disengaging the ISA if any of the conditions of steps (a), (b) and (c) are satisfied.

* * * * *